United States Patent
Ryss et al.

[11] 3,947,756
[45] Mar. 30, 1976

[54] DEVICE FOR GEOPHYSICAL PROSPECTING OF ORE DEPOSITS

[76] Inventors: Jury Samuilovich Ryss, prospekt Shvernika, 14, kv. 39; Jury Grigorievich Bakhtin, Pushkinskoe o/m, ulitsa generala Khazova, 45, kv. 66; Viktor Nikolaevich Chamaev, prospekt Metallistov, 78, korpus 2, kv. 370, all of Leningrad; Vladimir Mikhailovich Panteleimonov, poselok Revda, 10, kv. 5, Murmanskaya oblast, all of U.S.S.R.

[22] Filed: Feb. 10, 1975

[21] Appl. No.: 548,733

Related U.S. Application Data

[63] Continuation of Ser. No. 438,776, Feb. 1, 1974, abandoned.

[52] U.S. Cl. .................................. 324/1; 324/9
[51] Int. Cl.² ................................... G01V 3/04
[58] Field of Search ................ 324/1, 6, 9, 10

[56] References Cited
UNITED STATES PATENTS

| | | | |
|---|---|---|---|
| 3,659,192 | 4/1972 | Ryss et al. | 324/1 |
| 3,758,846 | 9/1973 | Ryss et al. | 324/1 |

*Primary Examiner*—Gerard R. Strecker
*Attorney, Agent, or Firm*—Holman & Stern

[57] ABSTRACT

A device for geophysical prospecting of ore deposits, wherein the supply circuit is made up of a direct-current source provided with apparatus for changing current intensity, a main current-carrying electrode having electrical contact with an ore body, and an auxiliary current-carrying electrode electrically connected with the medium enclosing said ore body. Connected in said supply circuit is a current intensity detector connected whereto is a series circuit made up of a compensating voltage generator, a summing unit and a unit for measuring the potentials of electrochemical reactions on the surface of the ore body. The latter unit is connected to the main current-carrying electrode. The device includes a unit for setting the time of excitation by direct current of the ore body and comprises, according to the invention, a series circuit made up of a unit for setting values of the potentials of electrochemical reactions on the surface of the ore body, a comparator and a control unit. A recording unit provided in the device is connected to the unit for setting values of the potentials of electrochemical reactions and to the current intensity detector to record in the form of polarization curves the relationships between the set potentials of electrochemical reactions on the surface of the ore body and the currents flowing through the surface of that body, which currents account for said potentials. The device also may have at least two current-carrying electrodes having contact with the medium enclosing the ore body.

5 Claims, 7 Drawing Figures

DEVICE FOR GEOPHYSICAL PROSPECTING OF ORE DEPOSITS

This is a continuation of application Ser. No. 438,776 filed Feb. 1, 1974, now abandoned.

BACKGROUND OF THE INVENTION

The present invention relates to apparatus for ore deposit prospecting, and more particularly to devices for geophysical prospecting, or exploration by the polarization curve method of ore deposits featuring an electronic conductivity.

Known at present is a device for geophysical prospecting of ore deposits by the polarization curve method, effecting galvanodynamic excitation of electrochemical reactions (cf. U.S. Pat. No. 3,659,192 issued Apr. 25, 1972).

The graphical relationship between the intensity of the current I flowing through the surface of an ore body and the value of the potential $\phi$ of the electrochemical reaction excited by the flow of said current is referred to as "the polarization curve".

If the recording of polarization curves is accompanied by variations of the current flowing through the surface of an ore body according to a preset program, the process is referred to as the galvanodynamic method of investigating an ore body (the realtionship $\phi = f(I)$ ), see for example U.S. Pat. No. 3,758,846, issued Sept. 11, 1973. If the recording of polarization curves is carried out with the potential $\phi$ of electrochemical reactions on the surface of the ore body being set according to a program, one speaks of the potentiodynamic method of investigating an ore body (the relationship $I = f(\phi)$ ).

The above-mentioned device for geophysical prospecting of ore depositis comprises a direct-current source with a means for changing current intensity, a main current-carrying electrode having electrical contact with an ore body and connected to the direct-current source, and an auxiliary current-carrying electrode having electrical contact with the medium enclosing the ore body and connected to the direct-current source. Connected between the direct-current source and one of the current-carrying electrodes, for example, the main electrode, is a current intensity detector. The device also comprises a unit for measuring the potentials of electrochemical reactions on the surface of the ore body. Inputs of the unit are connected to a summing unit and the main current-carrying electrode. The inputs of the summing unit are connected to a non-polarizing measuring electrode and to a compensating voltage generator connected to the current intensity detector. Connected to the current intensity detector and the potential measuring unit is a unit for recording polarization curves, whereas a unit for setting the time of excitation by direct current of the ore body is connected to the means for changing current intensity.

Variations of the intensity of the current flowing through the circuit including the direct-current source, the ore body and the current-carrying electrodes, effected according to a preset program by the unit for setting the time of excitation by direct current of the ore body, excite successive electrochemical reactions on the surface of said ore body. Joint operation of the current intensity detector, the compensating voltage generator, the summing unit and the potential measuring unit results in discriminating the values of the electrochemical reaction potentials at the output of the latter unit, which are recorded by the recording unit in the form of relationships ($\phi = f(I)$ ).

The polarization curves, which are multistep curves, are used to determine the electrochemical reaction potentials which, in turn, are used to determine the mineral composition of ore bodies and the values of the limiting current intensity of the reactions which help to establish the dimensions of ore bodies and other parameters thereof.

Yet, the galvanodynamic method of exciting electrochemical reactions, effected by the known device, has a disadvantage if there are excited electrochemical reactions having reaction potentials close to one another, it is difficult to distinguish these on a polarization curve. In addition, there often occurs a smooth transition from recording the potential of one electrochemical reaction to recording the potential of another electrochemical reaction (for example, in the case of streak-impregnation ores), which may lead to difficulties in determining the electrochemical reaction potentials on the polarization curve and, in particular, of the values of the limiting current intensity of these reactions and, consequently, to errors in determining the mineral composition of ores, especially with regard to small concentrations of minerals, as well as errors in determining the amount of minerals and the dimensions of ore bodies.

SUMMARY OF THE INVENTION

It is an object of the present invention to eliminate the above disadvantages.

The invention aims at providing a device for geophysical prospecting of ore deposits which would substantially raise the accuracy of determining the mineral composition of an ore body and the dimensions thereof.

This object is attained in a device for geophysical prospecting of ore deposits, comprising a direct-current source provided with a means for changing current intensity and having electrically connected whereto a main current-carrying electrode having electrical contact with an ore body, an auxiliary current-carrying electrode electrically connected with the medium enclosing said ore body, and a current intensity detector. Connected to the latter is a series circuit made up of a compensating voltage generator, a summing unit connected to a non-polarizing measuring electrode, and a unit for measuring the potentials of electrochemical reactions on the surface of the ore body and connected to the main current-carrying electrode. The device also includes a unit for setting the time of excitation by direct current of the ore body, which is electrically connected to a recording unit. The device is provided, according to the invention, with a series circuit made up of a unit for setting values of the potentials of electrochemical reactions on the surface of the ore body. The input of this circuit is connected to the unit for setting the time of excitation by direct current of the ore body, to a comparator whose other input is connected to the unit for measuring the potentials of electrochemical reactions on the surface of the ore body, and a control unit whose output is connected to the means for changing current intensity. The recording unit is connected to the unit for setting values of the potentials of electrochemical reactions on the surface of the ore body and to the current intensity detector to record, in the form of polarization curves, the relationships between the set potentials of electrochemical reactions on the surface of the ore body and the current flowing through the surface of that body which account for said potentials.

The object of the present invention is also attained in a device for geophysical prospecting of ore deposits, the device comprising a direct-current source, electrically connected whereto are at least two current-carrying electrodes having contact with the medium enclosing the ore body, and a current intensity detector, connected whereto is a series circuit made up of a compensating voltage generator, a summing unit connected to a non-polarizing measuring electrode, and a unit for measuring the potentials of electrochemical reactions and connected with another non-polarizing measuring electrode. The device also includes a unit for setting the time of excitation by direct current of the ore body, eletrically connected to a recording unit, the devivce is provided, according to the invention, with a series circuit made up of a unit for setting values of the potentials of electrochemical reactions on the surface of the ore body and whose input is connected to the unit for setting the time of excitation by direct current of the ore body, with a comparator whose other input is connected to the unit for measuring the potentials of electrochemical reactions on the surface of the ore body, and with a control unit whose output is connected to the means for changing current intensity. The recording unit is connected to the unit for setting values of the potentials of electrochemical reactions on the surface of the ore body and to the current intensity detector in order to record in the form of polarization curves of the relationships between the set potentials of electrochemical reactions on the surface of the ore body and the currents flowing through the surface of the ore body which account for said potentials.

It is expedient that the device include an electrical charge measuring unit, one input thereof being connected to the current intensity detector, and its other input being connected to the unit for setting the time of excitation by direct current of the ore body, and a second recording unit connected to the output of said unit and to the unit for setting values of the potentials of electrochemical reactions to record the relationships between the set potentials of electrochemical reactions on the surface of the ore body and the electrical charge required to maintain said reactions with said potentials.

The device may comprise a third recording unit connected to the current intensity detector and the unit for setting the time of excitation by direct current of the ore body in order to record time variations of the current intensity with constant potentials of electrochemical reactions on the surface of the ore body.

This makes it possible to substantially raise the accuracy of determining the dimensions of an ore body, its mineral composition, and the mineral content ratios due to a high resolving power of the device in determining the potentials of electrochemical reactions, as well as due to measuring the electrical charge consumed for each such reaction.

BRIEF DESCRIPTION OF THE DRAWINGS

The invention will hereinafter be explained in greater detail with reference to a specific embodiment thereof taken in conjunction with the accompanying drawings, wherein.

DESCRIPTION OF THE PREFERRED EMBODIMENTS

Referring now to the accompanying drawings, the proposed device for geophysical prospecting of ore deposits comprises a direct-current source 1 (FIG. 1) provided with a means 2 for changing the intensity of the current through the circuit of the source 1, the means and the source making up a controllable direct-current source. The controllable direct-current source makes it possible, by applying control signals to the control input, to vary the load current within a wide range, from values close to zero to nominal values. The controllable source may be made on the basis of direct-current machines, for example, amplidynes; it may also employ converters of alternating current to direct current (rectifiers) which may be adjusted both on the side of alternating current and on the side of direct current, for example, with the aid of controlled diodes (thyristors).

Figures 1, 2:
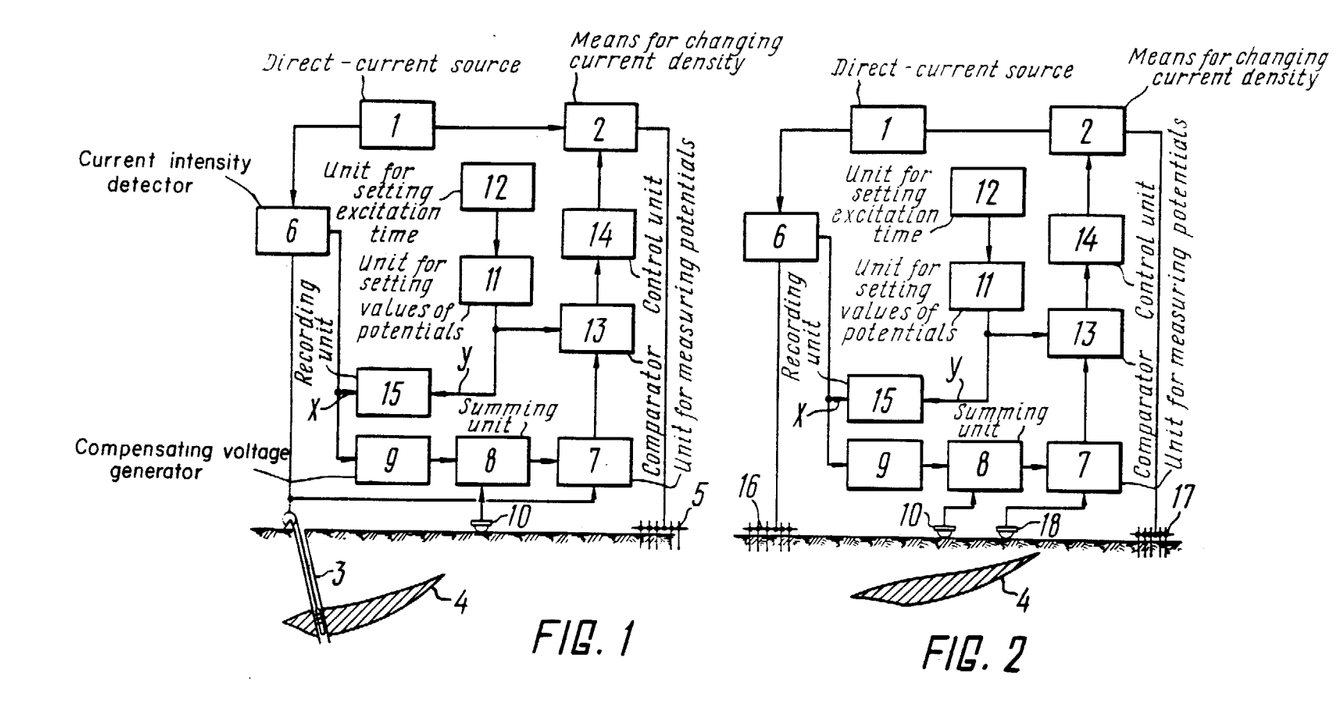
FIG. 1 is a general block diagram of the proposed device for geophysical prospecting of ore deposits.
FIG. 2 is a block diagram of a device for geophysical prospecting of ore deposits effecting contactless excitation of electrochemical reactions on the surface of an ore body.

The device also comprises a main current-carrying electrode 3 having electrical contact with an ore body 4 being prospected, and an auxiliary current-carrying electrode 5 which is in contact with the medium enclosing the ore body 4. Both electrodes are connected to the controllable direct-current source to form a supply circuit therewith. Connected in the supply circuit is a current intensity detector 6.

The main current-carrying electrode 3 is a special well attachment designed to provide electrical contact with the ore body by way of forcing the current-carrying elements thereof against the walls of the well over a large area. This results in low current densities at the points of contact.

As to the auxiliary current-carrying electrode 5, it is a conventional grounding attachment, such as metal spikes driven into the ground. The auxiliary electrode 5 is meant to transmit direct current from the power source to the ore body through the enclosing rock with minimum possible losses and consists, as a rule, of a system of conductors buried close to the ground surface at some distance from the ore body being prospected.

A unit 7 for measuring the potentials of electrochemical reactions on the surface of the ore body 4 is connected to a summing unit 8 and the main current-carrying electrode 3. The summing unit 8 is connected via a compensating voltage generator 9 to the current intensity detector 6 and a non-polarizing measuring electrode 10 receiving information of the potentials of electrochemical processes on the surface of the ore body 4. These processes are excited by the flow of polarizing current through the supply circuit from the controllable power source.

The function of the unit 7 for measuring the electrochemical reaction potentials is performed by a direct-current amplifier having a stable and constant transmission factor and calibrated in the values of the potentials of electrochemical reactions on the surface of the ore body 4.

The compensating voltage generator 9 is designed to obtain voltage whose value changes synchronously with variations of the current passing through the supply circuit. The transmission factor between the value of the current through the supply circuit and the output voltage of the compensating voltage generator may vary within a wide range depending upon specific conditions encountered when investigating an ore body. In order to meet specific purposes, the compensating voltage generator 9 may be provided with input and output terminals insulated from one another, i. e. a galvanic input-output isolation.

A unit 11 for setting values of the potentials of electrochemical reactions is connected with its input to a unit 12 for setting the time of exciting ore body 4 by direct current. The output of unit 11 is connected to a comparator 13. A second input of the comparator 13 is connected to the output of the unit 7 for measuring electrochemical reaction potentials, whereas the output of the comparator 13 is connected via a control unit 14 to the means 2 for changing the intensity of the current through the supply circuit.

A recording unit 15, which is an XY recorder, is connected with its input X to the current intensity detector 6 and with its input Y, to the unit 11 for setting values of the electrochemical reaction potentials. The recording unit 15 employs the rectangular coordinate system and records in the form of polarization curves the relationships between the set electrochemical reaction potentials and the polarizing current flowing through the surface of the ore body 4 which accounts for said potentials.

The unit 11 for setting values of the electrochemical reaction potentials is a set of precision resistors provided with switches (or a variable resistor), which are connected to a stabilized power source (not shown); the voltage across the output of that source may be set arbitrarily. The precision resistor switches (or the variable resistor) are actuated by the unit 12 for setting the time of excitation by direct current of the ore body 4. The unit 12 may be made in the form of a pulse counter with a variable pulse-repetition period (it may also be made in the form of a small low-power motor with a reduction gear; the speed of rotation of the output shaft of that motor may vary within a wide range depending upon specific prospecting conditions). Joint operation of the unit 11 for setting values pf the electrochemical reaction potentials and the unit 12 for setting the time of excitation by direct current of the ore body 4 determines the rate of electrochemical reactions on the surface of the ore body 4. Variations of the rate of electrochemical reactions make it possible to determine the optimum conditions for investigating the ore body and ensure the maximum effectiveness of the work.

While searching for minerals or prospecting for ore deposits, one often faces a situation when an ore body detected with the aid of geophysical apparatus requires detailed investigation, whereas no direct contact therewith through a well or prospecting hole has been yet provided. In such situations the proposed device for geophysical prospecting of ore deposits proves to be highly advantageous. In such cases the supply circuit is changed. A current-carrying electrode 16 (FIG. 2) has no electric contact with the ore body being prospected and is located on the opposite side of the ore body with respect to another current-supply electrode 17. The ore body 4 under exploration is found within the field of the flow of the electric current of both current-carrying electrodes 16 and 17; part of the supply circuit current flows through the ore body 4 and excites electrochemical reactions on the surface thereof. In order to record the values of the potentials of the electrochemical reactions taking place, the unit 7 for measuring electrochemical reaction potentials is connected to the summing unit 8 and to another non-polarizing measuring electrode 18 placed at an arbitrarily selected point at some distance from the current-carrying electrodes 16 and 17. The foregoing circuit is referred to as a system for contactless excitation of electrochemical reactions on the surface of an ore body.

While carrying out measurements with the use of the method of contactless excitation of electrochemical reactions, electrical insulation of the input and output terminals of the complensating voltage generator 9 becomes indispensable in order to rule out undesirable polarization of the measuring electrode 18 (and also to rule out the possibility of that electrode being rendered inoperative) due to the power provided by the direct-current source 1.

Figure 3:
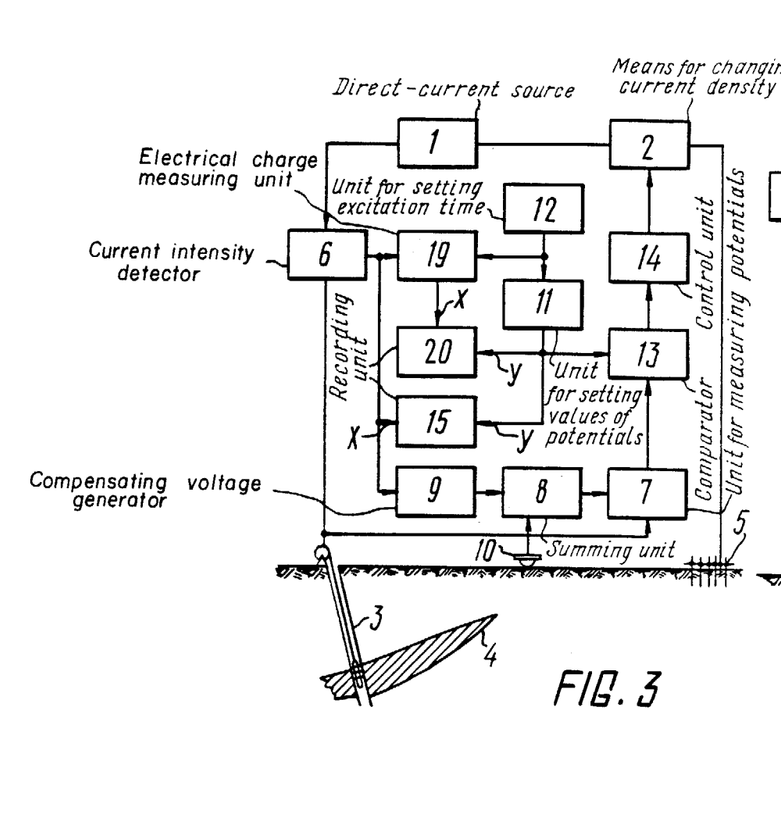
FIGS. 3 and 4 illustrate different versions of the general block diagram of the proposed device.

Within certain limits, each electrochemical reaction requires for the completion thereof a definite electric charge Q irrespective of the rate of the process; in view of this, the proposed device for geophysical prospecting of ore deposits includes, apart from the above-mentioned units, an electrical charge measuring unit 19 (FIG. 3) connected between the current intensity detector 6 and the unit 12 for setting the time of excitation by direct current of the ore body 4, and a second recording unit 20 which is an XY recorder whose input X is connected to the electrical charge measuring unit 19, while its input Y is connected to the unit 11 for setting values of the electrochemical reaction potentials. The recording unit 20 employs the rectangular coordinate system and records in the form of polarization curves the relationship between the set electrochemical reaction potential and the electrical charge consumed for the respective electrochemical reaction.

Figure 4:
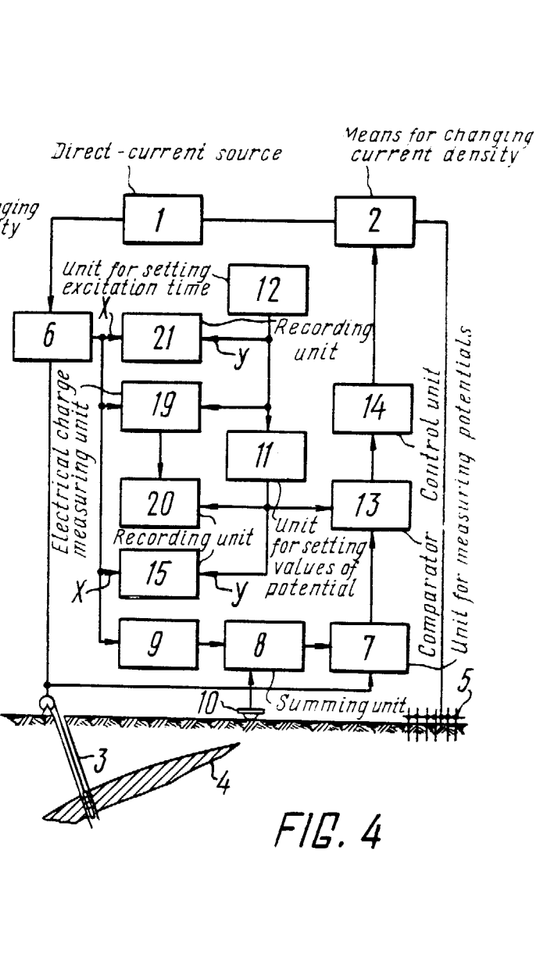

Apart from the foregoing units, the proposed device for geophysical prospecting of ore deposits may have a third recording unit 21 (FIG. 4) which is an XY recorder whose input X is connected to the current intensity detector 6 and input Y connected to the unit 12 for setting the time of excitation by direct current of the ore body 4. The latter recording unit is used to record graphically time variations of the ore body polarizing current, provided that the electrochemical reaction potential is maintained constant.

Figure 7:
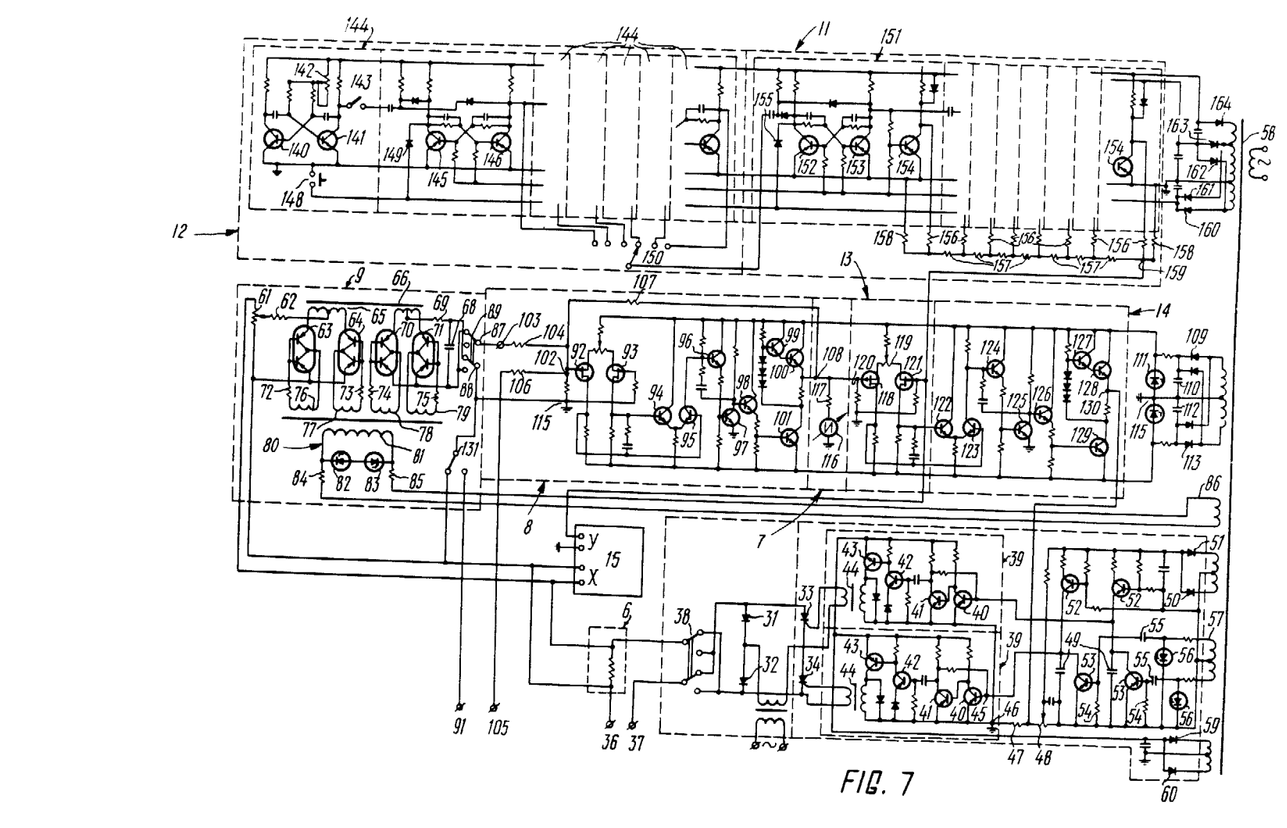
FIG. 7 is a version of a key diagram of the proposed device for geophysical prospecting of ore deposits.

Consider now a version of a key diagram of the proposed device for geophysical prospecting of ore deposits as shown in FIG. 7.

The direct-current source 1 is a controllable rectifier comprising non-controlled diodes 31 and 32 and controlled diodes (thyristors) 33 and 34 connected in a bridge circuit. One diagonal of the bridge circuit is connected to an isolation transformer 35, with the other diagonal of the bridge circuit being connected to output terminals 36 and 37 via a switch 38 which changes voltage polarity across the output terminals 36 and 37.

The control electrode of each of the thyristors 33 and 34 is connected to a pulse amplifier 39 with known circuitry built around transistors 40, 41, 42 and 43. A transformer 44 at the output of the pulse amplifier 39 is designed for creating galvanic isolation of the control electrode circuits of the thyristors 33 and 34 from the rest of the circuit. Points 45 and 46 are an input of the pulse amplifier, which is connected to a series circuit made up of a resistor 47, a variable resistor 48 and a capacitor 49. The capacitor 49 is connected to a rectifier built around diodes 50 and 51 via a current generator whose function is performed by a transistor 52 connected to the common base circuit. Connected in parallel to the capacitor 49 is a transistor 53 designed for periodic discharge of the capacitor 49. The base of the transistor 53 is connected to a differentiating circuit made up of a resistor 54 and a capacitor 55 which are connected to a stabilizer 56 for shaping rectangular pulses from the sinusoidal reference voltage across a winding 57 of a transformer 58. Built around diodes 59 and 60 is a rectifier for supplying the pulse amplifiers 39.

Connected in the circuit between the output terminal 36 and the switch 38 is the current intensity detector 6 made in the form of a heavy-duty precision resistor. Connected to the current intensity detector 6 is a compensating voltage generator 9, while a precision variable resistor 61 having a scale calibrated in resistance units is connected in parallel with the resistor of the current intensity detector 6. The resistor 61 is connected via a limiting resistor 62 and integrated breakers 63 and 64 to a winding 65 of an isolation transformer 66 whose secondary winding 67 is connected to an output capacitor 68 via a resistor 69, forming a filter 1 and integrated breakers 70 and 71. The base circuits of the integrated breakers 63, 64, 70 and 71 are connected via limiting resistors 72, 73, 74 and 75 to secondary windings 76, 77, 78 and 79 of a supply transformer 80 whose primary winding 81 is connected to a circuit made of stabilitrons 82 and 83 connected in series opposition, and which are designed to shape, together with limiting resistors 84 and 85, rectangular voltage from the sinusoidal reference voltage across a winding 86 of the transformer 58.

Output terminals 87 and 88 of the compensating voltage generator 9 are connected to the capacitor 68 via a switch 89 designed to change the voltage polarity across the output terminals 87 and 88 of the compensating voltage generator 9.

The summing unit 8 is made as a conventional direct-current amplifier, the first stage thereof employing field-effect transistors 92 and 93, whereas in other stages thereof use is made of bipolar silicon transistors 94, 95, 96, 97, 98, 99, 100 and 101. A summing point 102 is connected to the gate of the field-effect transistor 92 and coupled via a resistor 104 to a summing input 103 of the summing unit 8 and via a resistor 106, to another summing input 105 of that same summing unit 8. In addition, the summing point 102 is coupled via a feedback resistor 107 to an output terminal 108 of the d.c. amplifier.

One stabilized power source for the d.c. amplifier is built around diodes 109 and 110 and a stabilitron 111 and another stabilized power source is built around diodes 112 and 113 and a stabilitron 114, with said sources being connected in series. A common terminal 115 of the series interconnected power sources and the terminal 108 make up an output of the summing unit 8, connected whereto is the potential measuring unit 7 comprising a measuring instrument 116, whose scale is calibrated in volts, and a limiting resistor 117. The instrument and resistor are connected in series.

The comparator 13 and the control unit 14 are made as a d.c. amplifier of the type used in the summing unit 8.

The first stage of the amplifier is built around field-effect transistors and is a balanced stage. An input 120 of the balanced stage is connected to the output of the summing unit 8 and the potential measuring unit 7, whereas its input 121 is connected to the unit 11 for setting electrochemical reaction potentials. The remainder of the d.c. amplifier is built around bipolar silicon diodes 122, 123, 124, 125, 126, 127, 128, and 129. A terminal 130 and the terminal 115 make up an output of the control unit 14, connected whereto is the resistor 47.

A switch 131 in the compensating voltage generator 9 is designed to connect the terminal 115, which is common with the potential measuring unit 7, the input of the summing unit 8, the input of the comparator 13, and the output terminal 88 of the compensating voltage generator 9, to the terminal 36, or the terminal 91, connected whereto is the second non-polarizing electrode 18 used with a contactless version of the proposed device.

In the unit 12 for setting the excitation time, the function of a pulse generator is performed by a multivibrator built around transistors 140 and 141. A variable resistor 142 arranged in the base circuits of the transistors 140 and 141 is designed to vary the oscillation frequency of the multivibrator. Connected to the multivibrator built around the transistors 140 and 141 via a switch 143 are six series-connected flip-flops 144 built around transistors 145 and 146. The number of the flip-flops 144 may be different, depending upon the frequency of the multivibrator and the requirements imposed upon the device under specific operating conditions. A button switch 148 is coupled via diodes 149 to the collectors of the transistors 145 in the flip-flops 144 and is designed to set all the flip-flops into the initial state prior to operation. A switch 150 is designed to vary the numer of the flip-flops 144 in action, due to which the frequency of the pulses applied to the potential setting unit 11 may vary within a wide range.

Employed in the potential setting unit 11 is the conventional circuitry of "code-voltage" converters. The unit 11 comprises series connected flip-flops 151 built around transistors 152 and 153, and a switching transistor 154. The collectors of the transistors 152 are coupled via diodes 155 to the button 148 for setting all the flip-flops into the initial state thereof. The counting input of the first one of the flip-flops 151 is connected to the switch 150.

The collectors of the switching transistors 154 are connected to discharge resistors 156. The discharge resistors 156, series connected resistors 157, and load resistors 158 make up a binary voltage divider whose potential terminal 159 is connected to the input 121 of the comparator 13.

Built around diodes 160, 161 and 162, 163 are two series connected rectifiers for supplying the flip-flops 144 and 151 and built around a diode 164 is a rectifier for supplying the collector circuits of the switching transistors 154.

THEORY OF OPERATION

Prior to the application of current, there is a balanced potential $\phi_o$ on the surface of the ore body 4 (FIGS. 1 and 2) which is due to electrochemical processes connected with the oxidation-reduction properties of the medium enclosing the ore body 4. If a potential $\phi$ is set on the surface of the ore body 4, which is greater or smaller than the balanced potential, there will be no noticeable change in the oxidation-reduction processes conditioned by the enclosing medium until the potential reaches a value equal to that of the reaction potential with respect to some of the minerals contained in the ore body; hence, the current flowing from the source 1 is either nil or negligible.

Figure 5:
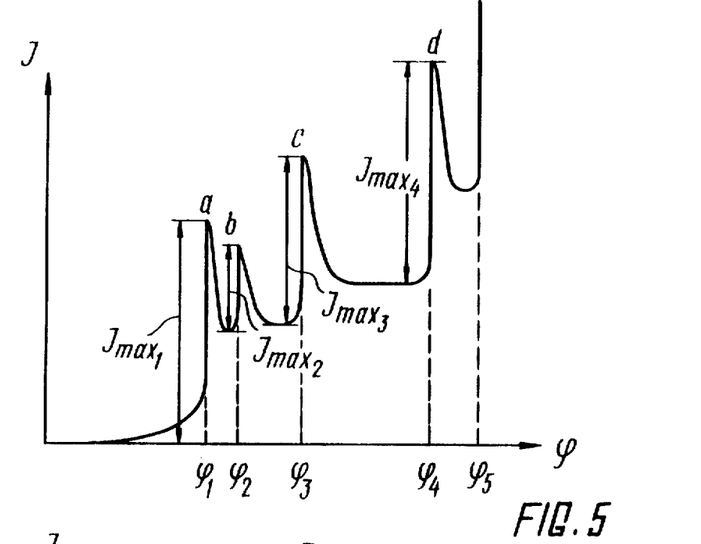
FIG. 5 is an example of a polarization curve representing the relationship between the ore body polarizing current and the electrochemical reaction potentials set on the surface of an ore body.

As the set potential $\phi_e$ reaches the value of the electrochemical reaction potential $\phi$ with respect to some of the minerals contained in the ore body, processes are brought about on the surface of the ore body connected with the electrochemical reaction in which said mineral is involved. This results in a sharp increase in the current through the supply circuit, which is consumed to maintain said electrochemical reaction. In the course of the accumulation of the products of the electrochemical reaction, the rate thereof slows down; simultaneously, the intensity of the current from the source 1 is reduced. The current intensity is either reduced to zero or to a low level corresponding to the balanced rate of the electrochemical reaction involving the mineral being investigated, which rate is due to specific conditions of removing the products of the electrochemical reaction from the reacting portions of the surface of the ore body 4. By way of changing the potential $\phi$ on the surface of the ore body 4 in the positive or negative direction, one sooner or later reaches the value of the electrochemical reaction potential $\phi$ with respect to another mineral contained in the ore body 4. This again raises the intensity of the current from the source 1 and then again reduces it due to the accumulation of the products of the second electrochemical reaction. Further increase in the set potential brings about a new electrochemical reaction, accompanied by a respective increase in the current intensity with respect to a third mineral, then to a fourth, etc. Thus, by changing the potential $\phi$ on the surface of the ore body 4, it is possible to excite successive electrochemical reactions involving different minerals contained in the ore body and record these in the form of a polarization curve representing the relationship between the intensity of the current I (FIG. 5) and the set potential $\phi_e$. On the polarization curve $I = f(\phi_e)$ the values of the set potential $\phi_e$, corresponding to the maximum current intensity values (points a, b, c, d), also correspond to the electrochemical reaction potentials with respect to different minerals. These values are known for each mineral and are used to establish the presence of some or other mineral in an ore deposit. The maximum current value $I_{max}$ for each electrochemical reaction is proportional to the amount of the respective mineral in an ore deposit; hence, from the values of $I_{max}$ one may judge of the content and mass of a given mineral in the ore body 4. The electrochemical reaction potential $\phi$ on the surface of the ore body 4 is measured in the form of voltage $U_s$ between the main current-carrying electrode 3 and the non-polarizing measuring electrode 10. Voltage $U_s$ includes voltage $U_\phi$ taken on the boundary between the ore body 4 and the enclosing rock and which contains information of electrochemical reaction potentials with regard to different minerals, and voltage $U_r$ which is due to the flow of current through the ohmic resistors of the supply circuit on the portion between the electrodes 3 and 10 (the enclosing rock, the ore body itself, the cable in the well, etc.). In order to discriminate the sought-for value of $U_\phi$ at the output of the potential measuring unit 7, which in some cases is equal to electrochemical reaction potentials $\phi$, voltage $U_s$ is applied to the input thereof via the summing unit 8 simultaneously with the compensating voltage $U_k$ generated by the compensating voltage generator 9 and selected to be equal in absolute value and opposite in sign to voltage $U_r$. The compensating voltage $U_k$ must change synchronously with the change in the intensity of the current I through the supply circuit so that $|U_k| = -|U_r|$; correspondingly, it is indispensable that $U_\phi = \phi$ at the output of the potential measuring unit 7. The synchronization of the change in the compensating voltage $U_k$ and that in the intensity of the current I is attained with the aid of a derived from the current intensity detector 6 and applied to the input of the compensating voltage generator 9. The function $|U_k| = -|U_r|$ is achieved by appropriately adjusting the compensating voltage generator 9. From the potential measuring unit 7, the electrochemical reaction potential $\phi$ is applied to the comparator 13, while applied thereto simultaneously is the set potential $\phi_e$ from the unit 11 for setting potential value. At the output of the comparator 13 there is generated a signal to regulate the current intensity in the supply circuit via the control unit 14 and the means 2 for changing current intensity. If at a certain moment of time the electrochemical reaction potential becomes smaller than the set potential $\phi_e$, at the output of the comparator 13 there appears a signal necessitating an increase in the intensity of the current I through the supply circuit. An increase in the intensity of the current I through the supply circuit raises the potential $\phi$ until $\phi = \phi_e$. Similarly, if at a certain moment of time the potential $\phi$ on the surface of the ore body 4 is greater than the value of the set potential, there appears a signal at the output of the comparator 13, necessitating a decrease in the intensity of the current I through the supply circuit. A decrease in the intensity of the current I results in a decrease in the electrochemical reaction potential $\phi$ until $\phi = \phi_e$. When the potential $\phi$ being measured is equal to the set potential $\phi_e$, there is a signal at the output of the comparator 13 necessitating a specific current intensity maintained in the supply circuit. It does not take much time to establish correspondence between the set potential $\phi_e$ and the actual potential $\phi$ on the surface of the ore body 4. The values $\phi_e$ and I are recorded by the recording unit 15. As the set potential $\phi_e$ is successively changed with the help of the unit 11 for setting the potential values, the recording unit 15 records the relationship between $\phi_e = \phi$ and the current I, which corresponds to the polarization curve $I = f(\phi)$ which is used to determine the mineral composition and dimensions of the ore body 4.

OPERATION

The appended key diagram (FIG. 7) illustrates the operation of the proposed device and the sequence of the interaction of its units and of passage of signals through the circuits thereof.

Electric power in the form of alternating current is applied via the transformer 35 to the rectifier bridge made up of the diodes 31 and 32 and the thyristors 33 and 34, wherefrom resulting direct current is applied via the switch 38, the terminal 36 with the main current-carrying electrode 3 connected thereto, and the terminal 37, arranged with the auxiliary current-carrying electrode connected thereto, to the surface of the ore body 4 being explored to excite electrochemical processes thereon. The intensity of the excitation current depends upon the thyristors 33 and 34. If the thyristors 33 and 34 are made conducting by applying a control pulse from the pulse amplifier 39 to the control electrode of the thyristor as soon as there is positive voltage at the anodes of the thyristors 33 and 34, the excitation current is at its minimum.

The excitation current is decreased if the control pulse from the pulse amplifier 39 is applied to the control electrodes of the thyristors 33 and 34 with a lag (or with a phase shift) with respect to the start of the action of the positive voltage upon the anodes of the thyristors 33 and 34. The excitation current is equal to zero if in the presence of positive voltage at the anode of the thyristor no control pulse is applied to the control electrodes of the thyristors 33 and 34. A phase shift between the control pulse and the start of the action of the positive voltage at the anodes of the thyristors 33 and 34 is obtained by comparing the saw-tooth voltage across the capacitor 49 to the control voltage across the resistor 47 and the bias voltage across the resistor 48. The saw-tooth voltage across the capacitor 49 originates due to said capacitor being charged via the current generator built around the transistor 52 and being discharged over equal intervals at moments when the transistor 53 becomes conducting under the action of a pulse from the differentiating circuit 54, 55. With the voltage across the capacitor 49 being smaller than that across the resistors 47 and 48, cutoff voltage is being applied to the input 45, 46 of the pulse amplifier 39. At a moment when the voltage across the capacitor 49 is greater than that across the resistors 47 and 48, the transistor 40 becomes conducting, and the pulse amplifier 39 generates a control pulse. The circuit is tuned so as to ensure a maximum phase shift of the control pulses with a maximum voltage across the resistor 48 and zero voltage across the resistor 47, said shift corresponding to zero current through the surface of the ore body 4. An increase in the voltage across the resistor 47 is bound to reduce the phase shift of the control pulse and increase the current through the surface of the ore body 4.

When using the contact method of exciting the ore body 4, the switch 131 connects the point 115 to the output terminal 36 signal voltage $U_s$ is applied via the terminal 105 connected to the non-polarizing electrode 10, and current proportional to the input signal is applied via the resistor 106 to the summing point 102. Simultaneously, applied to the summing point 102 via the resistor 104 is the compensating current which is proportional to the compensating voltage $U_k$ applied to the point 103 from the compensating voltage generator 9. Applied to the summing point 112 is the current from the output 108, 115 of the summing unit 8, which is proportional to the reaction potential $\phi$, with said current also being applied to the potential measuring unit 7 and the input 120 of the comparator 13. Applied to the input 121 of the comparator 13 from the terminal 159 of the potential setting unit 11 is the set potential $\phi_e$.

The difference between the potentials $\phi$ and $\phi_e$ across the outputs 120 and 121 is amplified by the control unit 14 and is applied in the form of control voltage, depending upon which is the excitation current, from the points 130, 115 to the resistor 47. With normal operation of the circuit, the intensity of the excitation current I is such as to meet the requirement of a minimum difference between the set potential $\phi_e$ and the potential $\phi$ of the electrochemical reaction on the surface of the ore body 4.

When using the contactless method of exciting the ore body 4, the switch 131 connects the point 115 to the input terminal 91 connected whereto is the second non-polarizing electrode 18. The compensating voltage from the current intensity detector 6 in the compensating voltage generator 9 is emitted from the galvanic isolation unit built around the transformer 66. The compensating voltage $U_k$ from the resistor 61 is applied via the limiting resistor 62 to the winding 65 of the transformer 66 by successively actuated integrated breakers 63 and 64, with said voltage being alternately applied to the right and left portions of the winding 65. Induced in the core of the transformer 66 is a varying magnetic flux which generates alternating voltage across the winding 67. The alternately actuated integrated breakers 70 and 71 connect the right and left portions of the winding 67 to the output terminals 88 and 87, which is done synchronously with the operation of the integrated breakers 63; as a result, voltage of the same polarity is discriminated across the output terminals. Connected upstream of the output terminals 87 and 88 is a filter built around the resistor 69 and the capacitor 68 and designed to reduce discontinuous jamming due to the operation of the integrated breakers.

The rest of the circuit's operation is similar to that with the use of the contact method which has been described above.

As the body 4 is being excited by direct current, of great importance is the rate of change in the electrochemical reaction potential $\phi$, which is determined both by the dimensions of the ore body and the mineral composition thereof.

The value of the electrochemical reaction potential $\phi$ is determined by the potential $\phi_e$ found at the point 159. Depending upon the state of the flip-flops 151, which make up a pulse counter, or the number of pulses applied to the input of the first one of the flip-flops 151 from the switch 150, the potential $\phi_e$ may be set by steps in a discrete manner (there are 256 steps in the specific embodiment of the circuit discolsed herein).

The size and number of the steps are determined by the range of the set electrochemical reaction potentials $\phi$.

The rate of increase of the potentials $\phi_e$ at the point 159 is determined by the repetition period of the pulses sent from the switch 150. The pulse repetition period is set by the self-oscillation frequency of the multivibrator built around the transistors 140 and 141. The self-oscillation frequency of the multivibrator may be varied within a certain range by the variable resistor 142. The output pulse repetition frequency is varied within a wider range by the use of frequency dividers built around the flip-flops 144. The number of the flip-flops 144 employed in the dividers determines the degree of the decrease in the initial frequency of the multivibrator and stems from specific conditions associated with investigating the ore body 4.

To ensure normal operation of the proposed apparatus, it is necessary that prior to the start of operation the set potential $\phi_e$ be made equal to zero. This is done by setting the switch 148 in the "on" position. As a result, the flip-flops 144 of the frequency divider and the flip-flops 151 of the pulse counter and the "code-voltage" converter assume the initial position. As the switch 143 is closed, pulses from the multivibrator built around the transistors 140 and 141 start being applied to the frequency divider and, via the switch 150, to the pulse counter built around the flip-flops 151 in the "code-voltage" converter. Hence, beginning with the moment when the switch 143 is closed, the set potential $\phi_e$ at the point 159 is increasing, changing thereby the potential $\phi$ of electrochemical reactions on the surface of the ore body 4.

Simultaneously, the set potential $\phi_e$ is applied from the point 159 to the input Y of the recording unit 15. Also applied to the input X whereof in the meantime being voltage from the current intensity detector 6. As a result, a polarization curve is recorded.

By comparing the values of the electrochemical reaction potentials $\phi_1$, $\phi_2$, $\phi_3$, $\phi_4$, $\phi_5$ (FIG. 5) found on the polarization curve to known tabulated values it is possible to establish the presence in ore deposits of such minerals as pyrite ($\phi_1 = 0.5$ V and $\phi_5 = -1.35$ V), chalcopyrite ($\phi_2 = -0.6$ V), galenite ($\phi_3 = -0.8$ V) and sphalerite ($\phi_4 = -1.2$ V). The values of $I_{max}$ for electrochemical reactions with respect to each mineral, which are also derived from said polarization curve, make it possible to establish, for example, that $I_{max} < I_{max} < I_{max} < I_{max}$. This is indicative of the fact that the mass of pyrite in the ore is greater than that of sphalerite, the masses of galenite and chalcopyrite being still greater. Relationships have been established (cf. Yu.S.Ryss, "Contact Polarization Curve Method for Prospecting Ore Bodies", the Nedra Publishers, Moscow, 1973) which help to derive from the values of $I_{max}$ such parameters as the area, linear dimensions, mineral content, and mineral masses of ore bodies.

According to Faraday's law, the amount of reacting substances is proportional to the electrical charge Q. This value may be registered irrespective of the lag of measuring instruments and the rate of electrochemical reactions. The recording of the electrical charge consumed to maintain an electrochemical reaction makes it possible to raise the accuracy of determining the amount of minerals in an ore body and the dimensions thereof.

As electrochemical reactions are being excited on the surface of the ore body 4 in the manner that has been described above, the electrical charge measuring unit 19 (FIG. 3) multiplies the values of the intensity of the current I flowing through the supply circuit by the time intervals $\Delta t$ determined by the unit 12 for setting the time of excitation by direct current of the ore body 4. The result obtained in the form of the electrical charge Q is transmitted to the recording unit 20 where it is recorded depending upon the potentials $\phi_e$ set by the unit 11 for setting electrochemical reaction potentials. The presence of latter unit makes it possible to measure the electrical charge consumed for individual electrochemical reactions and, consequently, raise the accuracy of determining the quantiative mineral composition and dimensions of the ore body 4.

Polarization curves obtained in the coordinates "$Q - \phi$" (not shown) do not differ in their form from those in the coordinates "$I - \phi$". The values of $\phi_1$, $\phi_2$, etc. derived from the curves, as well as those of $Q_1$, $Q_2$, etc. are used to determine the composition and dimensions of the ore body 4, as well as the masses of minerals and metals therein.

With respect to an individual mineral, each electrochemical reaction has a specific nature expressed in the rate of the process and reflected in the curves which illustrate the relationship between the current intensity and the time (FIG. 6) during which an electrochemical process is underway with regard to a specific mineral. The polarization curves $I = f(t)$ make it possible to use a new parameter, the change in the reaction rate, to determine the mineral composition of ore bodies and check the results of measurements carried out with the use of the polarization curves $I = f(\phi)$.

As a potential, for example, $\phi_5$ (or $\phi_2$, $\phi_3$, etc.) is set on the surface of the ore body 4 with the aid of the unit 11 for setting electrochemical reaction potentials, the recording unit 21 (FIG. 4) records a curve characterizing time variation of the reaction rate in the form of the relationship $I = f(t)$, with the reaction potential constant.

Figure 6:
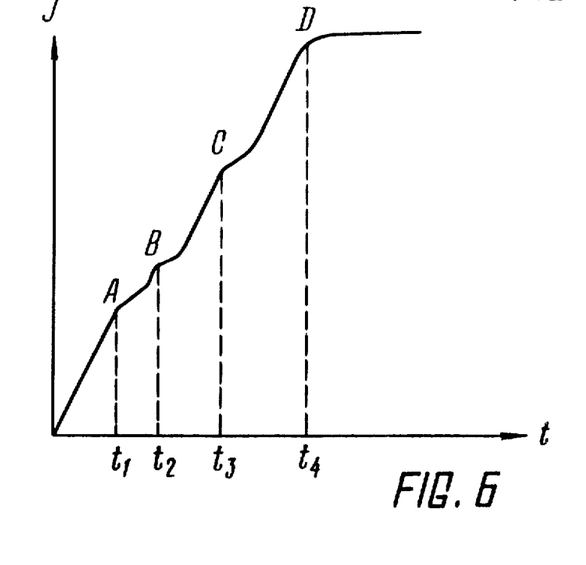
FIG. 6 is an example of a polarization curve representing time variations of the ore body polarizing current with a preset constant potential of electrochemical reactions on the surface of an ore body.

FIG. 6 shows such a curve from which it is seen that the increase in the current with the set potential $\phi$ is different at different moments of time; in other words, $dI/dt$ is not constant. The changes are due to successive excitation of reactions with respect to different minerals. The portion from zero to A covers electrochemical reactions involving the first mineral; and up to B, the second mineral; up to C, the third mineral; up to D, the fourth mineral. Judging from the number of steps on the curve, characterized by the portions OA, AB, BC, CD, it is possible to establish the number of minerals in the ore body 4 and the ratios between them. As massive ores gradually dissolve into streak ores, the steps become less distinct, whereas the time $t_1$, $t_2$, $t_3$, $t_4$ of the transition from one process to another increases. Therefore, it is possible to judge from the way individual steps manifest themselves and from the time values $t_1$, $t_4$, $t_3$, $t_4$ of the structure of ores.

Thus, the device of the present invention makes it possible to explore an ore body with a limited access or without any access thereto, in greater detail and with a higher accuracy than any known apparatus. The proposed device makes it possible to determine the dimensions of an ore body, the mineral composition thereof, especially in the cases of small concentrations of minerals, the ratios between different minerals therein, etc. It is also no problem, by using the proposed device, to determine whether intersections of ore bodies belong to one ore body or to different ore bodies.

What is claimed is:

1. A device for geophysical prospecting of ore deposits, comprising, in combination: a direct-current source provided with a means for changing the intensity of a current which excites electrochemical reactions on the surface of an ore body; a current intensity detector having an input connected to said direct current source; a main current-carrying electrode having electrical contact with the ore body and connected to said direct current source via said current intensity detector; an auxiliary current-carrying electrode having electrical contact with a medium enclosing the ore body and also connected to said direct current source via said means for changing the intensity of the current; a compensating voltage generator having an input connected to said current intensity detector, a summing unit with one input connected to the output of said compensating voltage generator; a first unit having a plurality of inputs for measuring the potentials of electrochemical reactions on the surface of the ore body, one input thereof being connected to the output of said summing unit and another input connected to said main current-carrying electrode; a measuring electrode connected to said summing unit and responsive to the electric potential difference with respect to said main current-carrying electrode; a second unit for setting the time of excitation by direct current of the ore body to effect programmed modes of investigating electrochemical processes; a third unit for setting values of the potentials of the electrochemical reactions on the surface of the ore body, an input at the third unit being connected to said second unit for setting the time of excitation by direct current of the ore body; a recording unit having a first input connected to said third unit for setting values of the potentials of said electrochemical reactions and having a second input connected to the current intensity detector for recording in the form of polarization curves the relationships between the set potentials of the electrochemical reactions on the surface of the ore body and the currents flowing through the surface of that body which account for the potentials; a comparator to compare voltages applied from said third unit for setting values of the potentials of said electrochemical reactions, connected whereto is one input of said comparator, and from said first unit for measuring the potentials of the electrochemical reactions on the surface of the ore body, connected whereto is another input of said comparator; a control unit with an input connected to the output of said comparator, its output being connected to said means for changing current intensity, said later means causing the intensity of the current flowing through the circuit of said current-carrying electrodes to increase or decrease.

2. A device for geophysical prospecting of ore deposits, comprising in combination: a direct-current source provided with a means for changing the intensity of a current which excites electrochemical reactions on the surface of an ore body; a current intensity detector having an input connected to said direct current source; two main current-carrying electrodes having contact with a medium enclosing the ore body, one of said current-carrying electrodes being connected to said direct-current source via said current intensity detector and the second current-carrying electrode being connected to said direct-current source via said means for changing the intensity of the current; two measuring electrodes being in contact with the medium enclosing the ore body and responsive to the electric potential difference carrying information on the electrochemical reactions on the surface of the ore body; a compensating voltage generator having an input connected to said current intensity detector; a summing unit having an input connected to the output of said compensating voltage generator and a second input connected with one of said measuring electrodes; a first unit for measuring the potentials of the electrochemical reactions on the surface of the ore body, with a first input being connected to the output of said summing unit and a second input being connected to the second of said measuring electrodes; a second unit for setting the time of excitation by direct current of the ore body to effect programmed modes of investigating electrochemical processes; a third unit for setting values of the potentials of said electrochemical reactions on the surface of the ore body with an input being connected to said second unit for setting the time of excitation by direct current of the ore body; a recording unit having a first input connected to said third unit for setting values of the potentials of the electrochemical reactions and having a second input connected to the current intensity detector in order to record in the form of polarization curves relationships between the set potentials of the electrochemical reactions on the surface of the ore body and the currents flowing through the surface of that body which account for said potentials; a comparator to compare voltages applied from said third unit for setting values of the potentials of the electrochemical reactions, connected whereto is one input of said comparator, and from said first unit for measuring the potentials of the electrochemical reactions on the surface of the ore body, connected whereto is another input of said comparator, a control unit whose input is connected to the output of said comparator, its output being connected to said means for changing current intensity, which latter means raises or reduces the intensity of the current in said current-carrying electrodes.

3. A device as claimed in claim 1, further comprising an electrical charge measuring unit arranged for determining the electrical charge required to maintain each electrochemical reaction, one input thereof being connected to said current intensity detector, its other input being connected to said second unit for setting the time of excitation by direct current of the ore body, and a second recording unit having a first input connected to the output of said electrical charge measuring unit and a second input connected to said third unit for setting values of the potentials of the electrochemical reactions in order to record the relationships between the set potentials of the electrochemical reactors on the surface of the ore body and the electrical charge consumed to maintain the electrochemical reactions with the potentials.

4. A device as claimed in claim 1, further comprising a third recording unit connected to said current intensity detector and to said second unit for setting the time of excitation by direct current of the ore body to record time variations of the current intensity with constant potentials of the electrochemical reactions on the surface of the ore body.

5. A device for geophysical prospecting of ore deposits, comprising, in combination: a direct-current source provided with a means for changing the intensity of a current which excites electrochemical reactions on the surface of an ore body; a current intensity detector having an input connected to said direct current source; a main current-carrying electrode having electrical contact with the ore body and connected to said direct current source via said current intensity detector; an auxiliary current-carrying electrode having electrical contact with the medium enclosing the ore body and connected to said direct current source via said means for changing current intensity; a compensating voltage generator with an input connected to said current intensity detector; a summing unit having a first input connected to the output of said compensating voltage generator; a first unit for measuring the potentials of electrochemical reactions on the surface of the ore body, a first input thereof being connected to the output of said summing unit, a second input thereof being connected to said main current-carrying electrode; a measuring electrode connected to a second input of said summing circuit and responsive to the electric potential difference with respect to said main current-carrying electrode; a second unit for setting the time of excitation by direct current of the ore body to effect a programmed mode of investigating electrochemical processes; a third unit for setting values of the potentials of the electrochemical reactions on the surface of the ore body, the input thereof being connected to said second unit for setting the time of excitation by direct current of the ore body; a first recording unit having a first input connected to said second unit for setting values of the potentials of the electrochemical reactions and a second input connected to the current intensity detector to record in the form of polarization curves the relationships between the set potentials of the electrochemical reactions on the surface of the ore body and the currents flowing through the surface of that body which account for the potentials; a comparator to compare voltage applied from said third unit for setting values of the potentials of the electrochemical reactions, connected whereto is a first input of said comparator, and from said first unit for measuring the potentials of the electrochemical reactions on the surface of the ore body, connected whereto is a second input of said comparator; a control unit whose input is connected to the output of said comparator, its output being connected to said means for changing current intensity which raises or reduces the intensity of the current in said main and auxiliary current-carrying electrodes, an electrical charge measuring unit for determining the electrical charge required to maintain each electrochemical reaction, a first input thereof being connected to said current intensity detector, a second input thereof being connected to said second unit for setting the time of excitation by direct current of the ore body, a second recording unit having a first input connected to the output of said electrical charge measuring unit and a second input connected to said third unit for setting values of the potentials of the electrochemical reactions to record the relationships between the set potentials of the electrochemical reactions on the surface of the ore body and the electrical charge consumed to maintain the electrochemical reactions with the potentials; and a third recording unit having a first input connected to said current intensity detector and a second input connected to said second unit for setting the time of excitation by direct current of the ore body to record current intensity time variations with constant potentials of the electrochemical reactions on the surface of the ore body.

* * * * *